(12) United States Patent
Hayashi (10) Patent No.: US 6,301,381 B1
(45) Date of Patent: Oct. 9, 2001

(54) NEUROFILTER, AND METHOD OF TRAINING SAME TO OPERATE ON IMAGE DATA SUCH AS TO DISCRIMINATE BETWEEN TEXT AND PICTURE REGIONS OF AN IMAGE WHICH IS EXPRESSED BY IMAGE DATA

(75) Inventor: Masaaki Hayashi, Yokohama (JP)

(73) Assignee: Matsushita Electric Idustrial Co., Ltd., Osaka (JP)

( * ) Notice: Subject to any disclaimer, the term of this patent is extended or adjusted under 35 U.S.C. 154(b) by 774 days.

(21) Appl. No.: 08/601,751

(22) Filed: Feb. 15, 1996

(30) Foreign Application Priority Data

Mar. 7, 1995 (JP) .................................... 7-047645
Jul. 13, 1995 (JP) .................................... 7-177747

(51) Int. Cl.$^7$ ............................... G06K 9/62; G06K 9/34; G06K 9/40
(52) U.S. Cl. ........................... 382/156; 382/176; 382/264
(58) Field of Search .................................... 382/156–159, 382/176, 262, 264; 358/462, 464, 430; 395/21–24

(56) References Cited

U.S. PATENT DOCUMENTS

| 5,148,495 | * | 9/1992 | Imao et al. ........................... 382/176 |
| 5,187,592 | * | 2/1993 | Sugiyama et al. .................... 358/430 |
| 5,245,445 | * | 9/1993 | Fujisawa .............................. 382/176 |
| 5,339,365 | * | 8/1994 | Kawai et al. ........................ 382/176 |
| 5,608,819 | * | 3/1997 | Ikeuchi ................................ 382/156 |

* cited by examiner

Primary Examiner—Bhavesh Mehta
(74) Attorney, Agent, or Firm—Israel Gopstein Clark & Brody (57) ABSTRACT

A neurofilter is implemented as a neural network in which the weighting coefficients have previously been set, by an appropriate training procedure, such as to provide a desired form of filter response. The neurofilter is applicable to filtering of image data or serial data signals. Also, by training a neurofilter to produce output data based on amounts of error that occur in the output data from a conventional filter, a filter apparatus can be provided whereby the neurofilter compensates for errors in output data from the conventional filter. The design and manufacturing constraints on the conventional filter can thereby be substantially relaxed.

5 Claims, 7 Drawing Sheets

NEUROFILTER, AND METHOD OF TRAINING SAME TO OPERATE ON IMAGE DATA SUCH AS TO DISCRIMINATE BETWEEN TEXT AND PICTURE REGIONS OF AN IMAGE WHICH IS EXPRESSED BY IMAGE DATA

BACKGROUND OF THE INVENTION

1. Field of the Invention

The present invention relates to a neurofilter, which is a non-linear filter implemented as a neural network, and to a method of training a neurofilter to produce an output signal which discriminates between text and picture regions of an image expressed by image data which are supplied to the neurofilter.

The invention further relates to a filter apparatus in which a neurofilter is utilized to compensate for errors in the output signal from a conventional filter.

2. Prior Art

In the prior art, it has been necessary for designers of filters, for such applications as serial signal processing or image data processing, to have extensive experience in that field of work. This is due to the fact that considerable experience is necessary, to enable the designer to set the filter parameters to optimum values. Setting of the filter parameters is difficult, due to the fact that in general the transfer function of a filter is non-linear. Hence, it is necessary to use linear approximation functions to establish a preliminary design of a filter, and for the designer to then try to optimize the design by modifying the values of the filter parameters, on the basis of his experience.

Hence, in the prior art, the degree to which the performance of a filter approached optiumum has been dependent upon the experience of the filter designer, i.e. in general it has not been possible for other individuals to design a filter.

Furthermore even in the case of an experienced filter designer, due to the various forms of non-linearity of operation of an actual filter, it has been impossible to actually achieve optimum results.

SUMMARY OF THE INVENTION

It is an objective of the present invention to overcome the problems of the prior art set out above, by providing a neurofilter which is implemented as a suitably trained neural network, whereby an individual without experience in the field can easily produce a filter which provides optimum performance.

It is a further objective of the invention to provide a neurofilter which produces an output signal that discriminates between text and picture regions of an image expressed by image data which are supplied to the neurofilter, and to provide a suitable method of training such a neurofilter.

It is moreover an objective of the invention to provide a filter apparatus based on a conventional filter, and including a neurofilter for correcting errors in the output signal from the conventional filter, to thereby reduce the severity of design constraints of the conventional filter.

To achieve the above objectives, according to a first aspect of the invention, the invention provides a neurofilter which is a non-linear filter implemented as a neural network that has been trained (by adjustment of the weighting coefficients of the neural network) to have a predetermined filter response to an input signal.

According to a second aspect, the invention provides a method of training a neurofilter which produces an output signal that discriminates between text and picture regions of an image expressed by image data which are supplied to the neurofilter, with the training comprising a process of supplying image data expressing respective local regions of an image to the neurofilter, with said local regions alternately being within text regions and picture regions of the image, while setting a training signal to the '1' logic state when a local region within a text region is being supplied to the neurofilter and setting the training signal to the '0' logic state when a local region within a picture region is being supplied to the neurofilter.

According to another aspect, the invention provides a filter apparatus comprising a parallel combination of a neurofilter which has undergone a suitable training procedure and a conventional filter, with an output signal produced from the neurofilter, in response to an input signal supplied to the filter apparatus, being combined with an output signal produced from the conventional filter in response to that input signal, for thereby obtaining an output signal in which errors in the response characters of the conventional filter have been compensated by the output signal from the neurofilter. As a result, it becomes very much easier to design and manufacture such a conventional filter while obtaining optimum performance from the filter apparatus.

With the present invention, since filter parameters are determined by a neurofilter, i.e. a neural network which has been trained to provide a suitable non-linear response to an input signal, it becomes possible for anyone to construct a filter which provides optimum results.

In the case of a filter apparatus which is a combination of a neurofilter and a conventional filter, only the error component of the output signal from the conventional filter is compensated by the output signal from the neurofilter. It has been found in practice that this enables a highly effective filter apparatus to be achieved.

DESCRIPTION OF PREFERRED EMBODIMENTS

Figure 1:
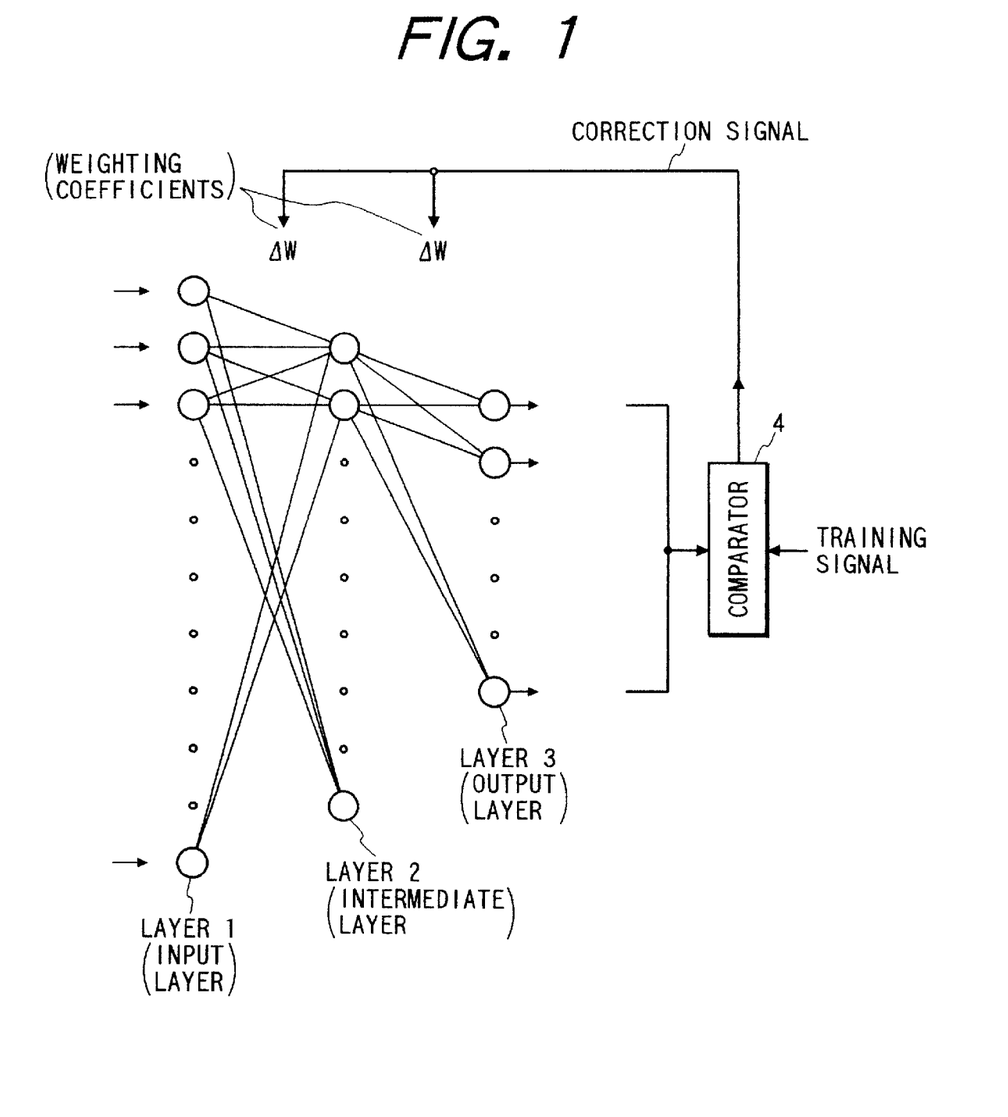
FIG. 1 is a diagram illustrating the basic features of a neural network suitable for use as a neurofilter.

Before describing embodiments of the invention, an example of a neural network which can be used to implement a neurofilter will be described, referring to FIG. 1. FIG. 1 illustrates the condition in which the neural network is being trained to provide a desired relationship between an input signal supplied thereto and a resultant output signal. The input signal is supplied to the neural network as successive sets of parallel signal values. In the case of processing image data for example, these signal values may be respective values of picture elements within a local region of the image, i.e. within a scanning window, which is successively stepped across an array of picture element values representing an image. It will be assumed that a single output value is produced in response to each such set of input signal values, i.e. the neural network produces an output signal that is a series of these output values. As shown, the neural network example is a multi-layer type, and consists of an input layer 1 of neurons, whose output values are multiplied by respective weighting coefficients before being supplied to the second layer 2 of neurons, whose output values are similarly supplied to the layer 3, which is assumed here to be the output layer of the neural network.

During training of such a neural network, a training signal (consisting of successive values which are predetermined as optimum values with respect to the input signal to the neural network) is supplied to one input of a comparator 4, in synchronism with supplying the input signal to the neural network. The amount of error between the optimum values expressed by the training signal and the actual output values obtained from the neural network is applied, e.g. as a correction signal as indicated in FIG. 1, to adjust the weighting coefficients of the neural network in a direction such as to reduce the amount of error. Back-propogation algorithms for efficently performing such a training operation on a multi-layer neural network, with the training and input signals being repetitvely applied until the amount of error becomes sufficiently small, are now well known, so that detailed description will be omitted.

It should be noted that it would also be possible to use other configurations of neural network to implement a neurofilter with the present invention.

Figure 2:
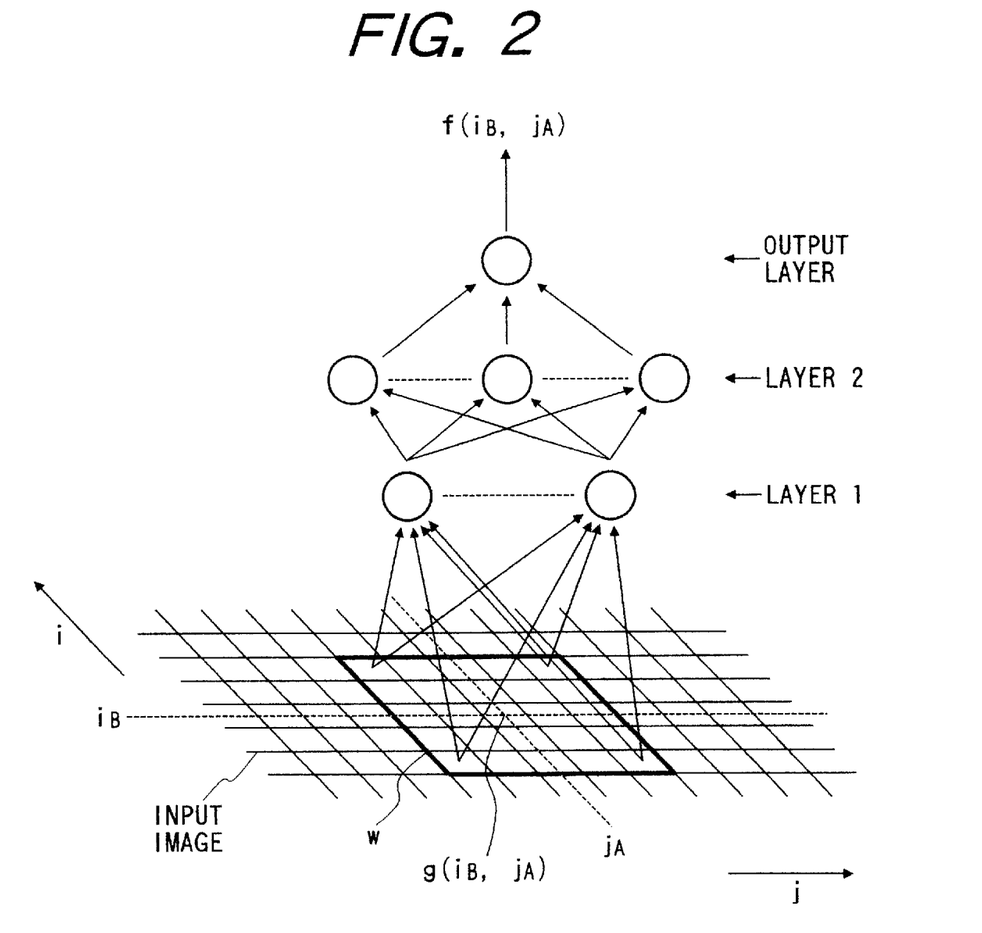
FIG. 2 is a conceptual diagram for illustrating the application of a neurofilter to processing of image data.

The manner of applying such a neurofilter to processing of image data is illustrated by the simple conceptual diagram of FIG. 2. Here, an input image is represented as a two-dimensional array of picture element values, having coordinate axes i and j as shown. A local region W (i.e. a scanning window), is successively selected from the array of picture element values, by successive steps in the j and i directions, while the picture element values within the local region are supplied to the input layer of the neural network. The diagram of FIG. 2 has been made extremely simple, with only part of the neurons being shown, and it should be understood that in practice the picture element values within the local region may be coupled to respectively corresponding neurons of the input layer.

In the example of FIG. 2, the center picture element value of the local region is designated as having the array position $g(i_B, j_A)$, and that the corresponding output value obtained from the neurofilter is designated as $f(i_B, j_A)$, within a similar array of picture element values expressing an output image. That is to say, the output value $f(i_B, j_A)$ is obtained by applying a non-linear function to the set of picture element values within the local region W, with that non-linear function being determined by that training procedure which has been applied beforehand to the neural network.

As described in the following, a neurofilter can be used for MTF compensation in image signal processing, i.e. can be used to restore sharpness to an image (expressed as image data, i.e. a pixel array) which has been blurred due to the effect of lenses through which light from the original image is directed onto an opto-electric device such as a CCD, within an optical data transmission system. Thus the transfer function of blurring by a system depends on the individual system. A neurofilter can also be utilized to distinguish between text and picture regions of an image.

In the case of MTF compensation, during neurofilter training, a training signal (which is used to establish suitable weighting coefficient values) is generated such as to constitute data which accurately represent a non-blurred original image, while an input signal to the neurofilter expresses a corresponding blurred image.

In the case of a neurofilter used for segmenting an image between text and picture regions, the training signal preferably takes the values of logic '2' or '0', in accordance with whether the input signal (i.e. combination of values being supplied to the input layer of the neurofilter) which is currently being supplied to the neurofilter expresses a local region within a text region or a local region within a picture region of the image.

If the input signal that is to be processed by a neurofilter is expressed as a function of time x(t). then $$x(t) = \sum_{l=1}^{N} \sin 2\pi f_l t \qquad (1)$$

In that case the corresponding teaching signal d(t) is:

$$d(t) = \sum_{l=1}^{N} a_l \cdot \sin(2\pi f_l t + \theta_l) \qquad (2)$$

In the above, $f_l$ represents frequency, while $\theta_l$ represents phase.

Use of a neurofilter in MTF compensation processing will be described in the following. The MTF compensation is applied to compensate for blurring which has resulted from applying a specific transfer function to the data representing an original image. Designating that transfer function as H(m, n), the following relationship exists:

H(m, n)=G(m, n)/F(m, n)

If a neural network is to apply compensation for blurring resulting from the effects of the transfer function H(m, n), then the following should be true:

C(m, n)=1/H(m, n)

In the above, F(m, n) is the Fourier function of the original image, which is expressed as a 2-dimensional data array f(i, j). G(m, n) is the Fourier function of the output image data from the neurofilter, which is a data array g(i, j). C(m, m) is the Fourier function of the neurofilter.

Figure 3:
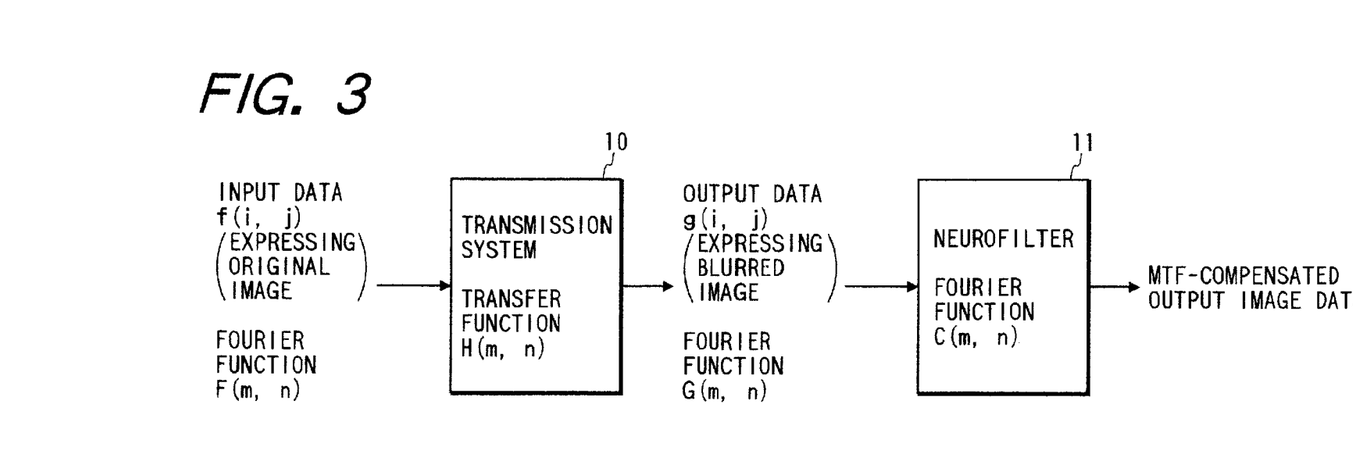
FIG. 3 illustrates the basic operation flow whereby a neurofilter applies MTF compensation to image data expressing a blurred image, with a first embodiment of the invention.

The manner in which the neurofilter is used to apply MTF compensation is therefore of the form shown in the conceptual diagram of FIG. 3.

It can thus be understood that if the neurofilter executes a suitable convolution operation on the data expressing the blurred image, it becomes possible to recover the spatial frequencies which were present in the original image and which were lost as a result of applying the transfer function H(m, n). The neurofilter can be trained to execute such a convolution, by applying training processing to adjust the weighting coefficients of the neurofilter, using a training signal f(i, j) which expresses an original (i.e. non-blurred) image while supplying to the neurofilter an input signal g(i, j) which expresses the corresponding blurred image. After completion of such training, with the weighting coefficients having been fixed, if an arbitrary distorted input signal g'(i, j) representing a blurred image is supplied to neurofilter (i.e. with the blurring having resulted from applying the specific transfer function H(m, n)), then the image expressed by the output signal from the neurofilter will be substantially free from the blurring.

Figure 4:
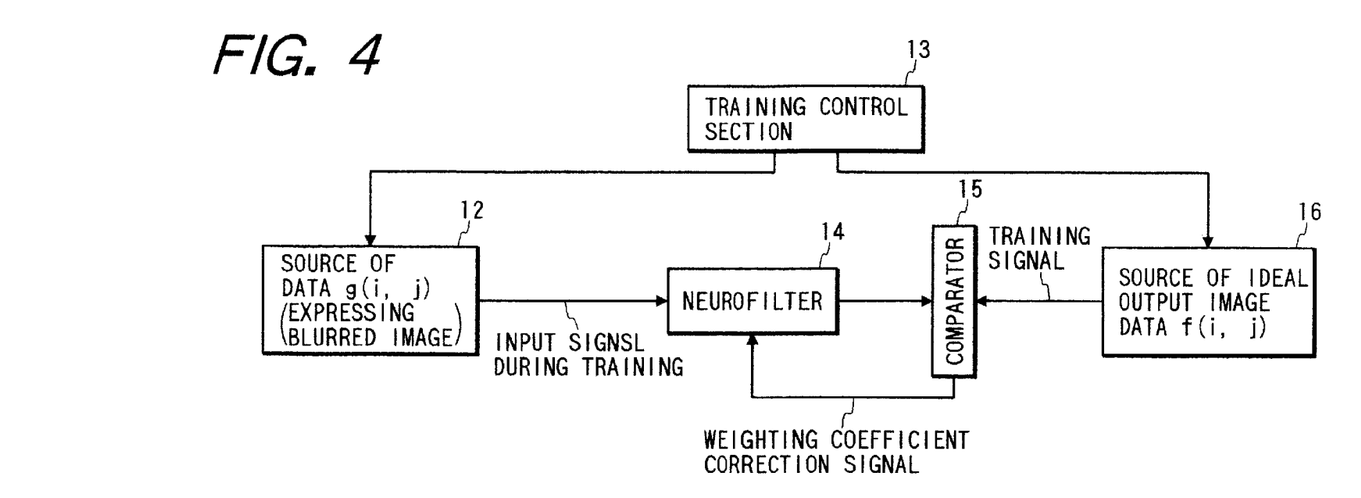
FIG. 4 is a general block diagram illustrating the method of setting the weighting coefficients of the neurofilter used with the first embodiment.

The basic elements of such a training procedure are illustrated in FIG. 4. Here, numeral 12 denotes a source of image data g(i, j) which represents a blurred image, resulting from the effects of a specific transfer function, numeral 16 denotes a source of original image data f(i, j), i.e. representing the non-blurred image corresponding to that of the data in source 12. A training control section 13 controls the source 12 of data expressing the blurred image and the source 16 of the ideal output image data, to sequentially read out their respective image data in synchronism and so to supply respective input signals to a neurofilter 14 and to one input of a comparator 15. At any instant, for example, the input signal to the neurofilter 14 might be the contents of a local region such as the local region W of the image data array shown in FIG. 2, with the central picture element value of the local region being $g(i_B, j_A)$, and with the teaching signal at that instant consisting of the corresponding ideal image data value $f(i_B, j_A)$. The resultant output signal value from the neural network is compared with the training signal value, and correction is applied to the weighting coefficients of the neurofilter in accordance with the amount of error that is found.

By repetitively executing such training of the neurofilter until the amount of error becomes sufficiently small, for each of a number of different images (each of which has blurring that results from the same specific transfer function H(m, n)), suitable values can be fixed for the weighting coefficients of the neurofilter.

It has been found in practice that this embodiment is highly effective in achieving MTF compensation.

Figure 5:
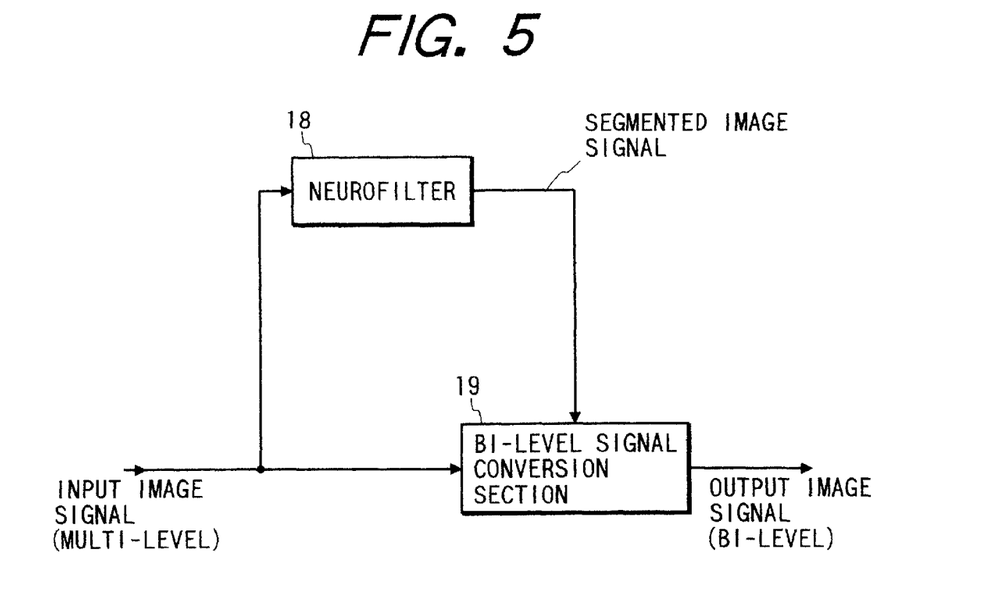
FIG. 5 is a general block diagram illustrating an application of a neurofilter according to a second embodiment of the invention, which executes separation of text and picture regions of an input image.

Referring to FIG. 5, another embodiment of the invention is shown, consisting of a neurofilter 18. This neurofilter has the function of discriminating between text and picture regions of an input image, whose data are supplied as an input signal to the neurofilter. Specifically, the neurofilter produces an output signal, referred to herein as the segmented image signal, which represents an image in which each region corresponding to a text region of the original image is in a first state (e.g. white in color) while each region corresponding to a picture region of the original image is in a second state (e.g. black in color). It should be noted that the term "picture region" is used herein, as applied to an image which contains a mixture of text and non-text matter (such as drawings, photographs, etc.), to signify a region which contains such non-text matter.

The requirement for such a neurofilter is as follows. There are various data transfer applications in which an original image is scanned and corresponding image data are generated, with the image data being of multi-level type. As used herein, the term "multi-level" signifies "having more than two possible levels". However in many cases, it is necessary to convert such multi-level data to binary data, for transmission. Where the original image may be a mixture of text and picture regions, there are various possible approaches which have been taken in the prior art. One approach is to attempt to separate the original image into text and picture regions, to execute pseudo-halftone processing of the data of the picture regions (such as dither processing) to obtain binary image data, and to directly convert the data of the text regions to binary form (e.g. by threshold comparison).

In the prior art, methods such as frequency discrimination have been used, to attempt to discriminate between the text and picture regions of an image. However in practice, it is been found difficult to achieve satisfactory separation between the text and picture regions by such methods. As a result, with such a method, parts of the input image may not be converted appropriately to bi-level image data, so that the results obtained are not satisfactory.

In order to try to overcome that problem, it is possible to apply pseudo-halftone processing to the entire input image, i.e. to both the text and picture regions. However even if that is done, it is found necessary to apply a form of pseudo-halftone processing to the text regions which is different from that applied to the picture regions, in order to ensure satisfactory image quality. Thus, it is still necessary to distinguish between the text and picture regions of an input image, before applying such overall pseudo-halftone processing, so that it has not been possible in the prior art to obtain satisfactory results, using prior art techniques which do not provide correct separation between the text and picture regions.

Figure 6A:
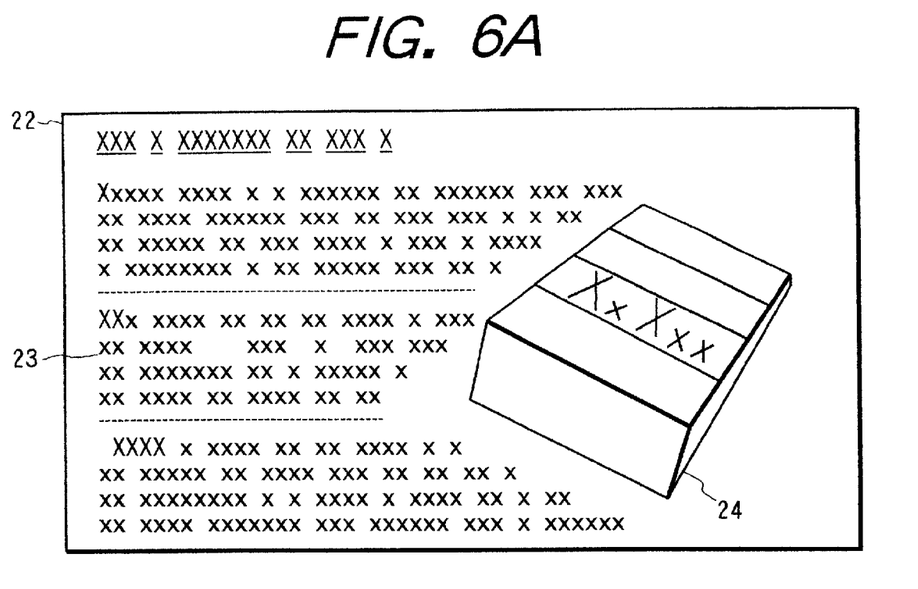
FIGS. 6A, 6B show an example of image separation performed by the second embodiment.
Figure 6B:
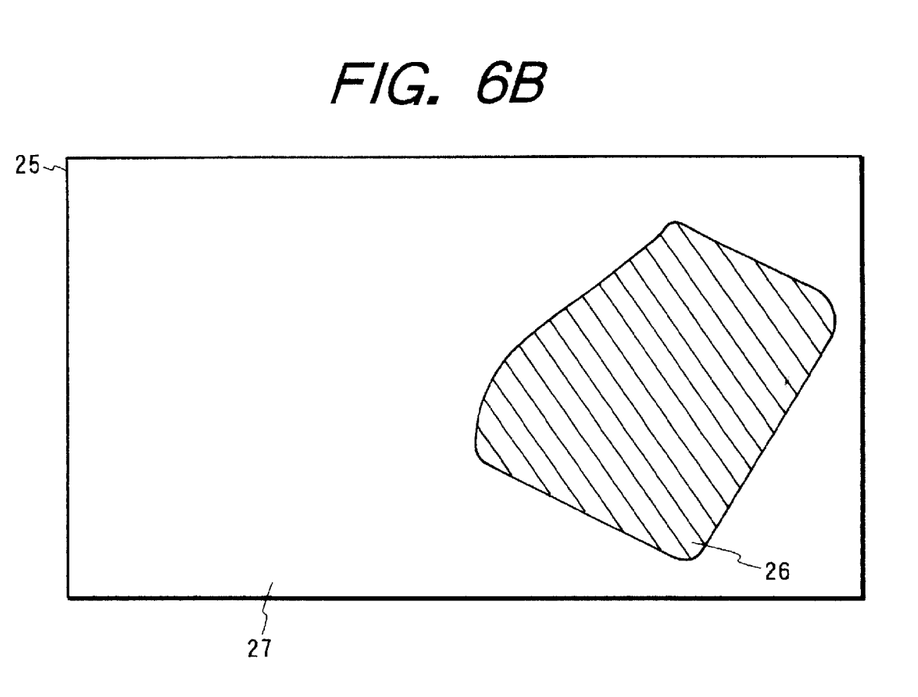

With the embodiment shown in FIG. 5 it becomes possible to apply pseudo-halftone processing to an entire input image, which is a mixture of text and picture regions, and to obtain satisfactory quality in the finally obtained image. This is made possible by using a neurofilter to perform separation between the text and picture regions of the input image. The neurofilter 18 receives an input image signal, consisting of sequential multi-level image data, and responds by producing the segmented image signal. The segmented image signal may for example attain the logic '1' state when the input image signal currently represents a local region within a text region of the input image, and the '0' state when the input image signal currently represents a local region within a picture region of the input image. That is illustrated in FIGS. 6A, 6B. FIG. 6A shows an example of an input image 22 (with arbitrary text characters being represented by the characters x or X) which is a mixture of a text region 23 and a picture region 24, i.e. having a drawing or photograph embedded within the text. The resultant segmented image signal from the neurofilter 18 is a bi-level signal which expresses the segmented image shown in FIG. 6B, which consists only of a picture region 26 and a text region 27.

It has been found that by applying suitable training to the neurofilter 18, more accurate and reliable separation of the text and picture regions can be achieved than has been possible by prior art methods.

In FIG. 5, the input image signal is also supplied to a bi-level signal conversion section 19, which applies pseudo-halftone processing to the entire image, to produce an output bi-level signal. The bi-level signal conversion section 19 applies respectively different pseudo-halftone in accordance with whether a text or picture region is currently being processed, as specified by the segmented image signal from the neurofilter 18, which is supplied as a control signal to the bi-level signal conversion section 19. In that way, it becomes possible to achieve optimum overall quality of the image which is expressed by the output of the bi-level signal conversion section 19.

Figure 8:
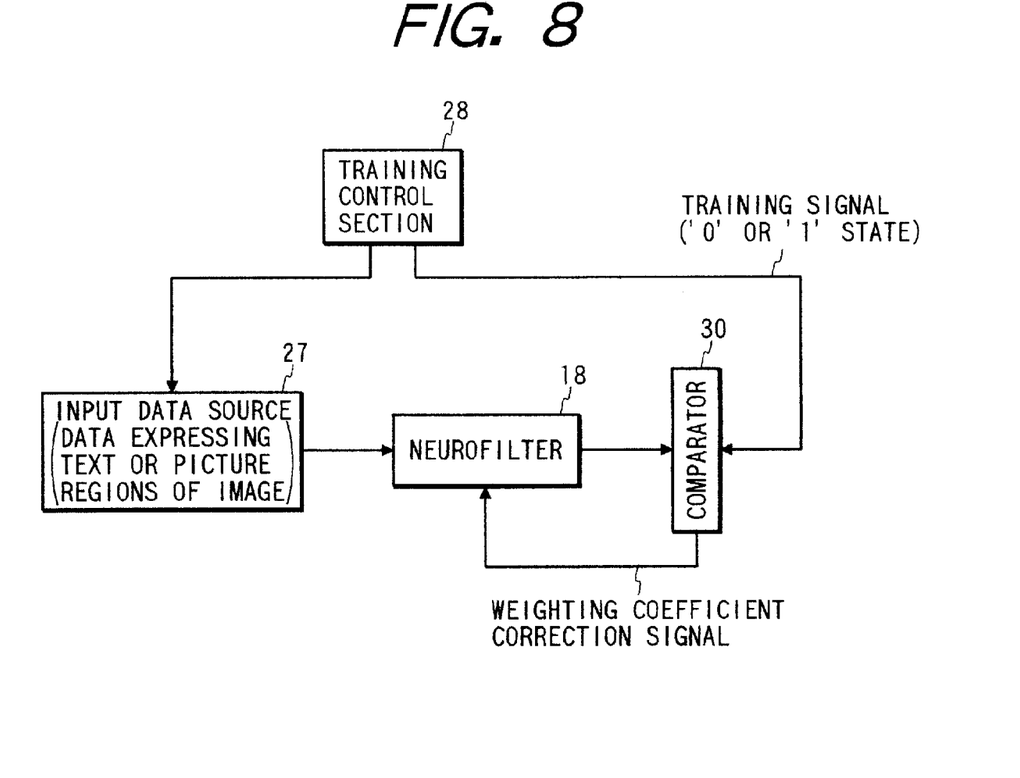
FIG. 8 is a general block diagram for illustrating a preferred method of setting the weighting coefficients of the neurofilter of the second embodiment.

Training of the neurofilter of this embodiment, i.e. establishing optimum values of the weighting coefficients, is preferably performed as follows, using the arrangement which is illustrated in FIG. 8. In this case, the training control section 28 causes the input data source to alternately select image data of a local region within a text region of an image which is expressed by multi-level image data (i.e. an image which is a mixture of text and picture regions, as described above) and image data of a local region within a picture region of the image, with these two types of data being alternately supplied in succession to the input layer of the neurofilter 18, as the input signal of the neurofilter. In synchronism with this, the training control section 28 generates (as a training signal for the neural network) an output signal at the '1' logic level when the input signal of the neurofilter 18 consists of image data from a text region, and at the '0' logic level when the input signal of the neurofilter 18 consists of image data from a text region 21, i.e. that training signal alternates between the '1' and '0' levels in accordance with the changes in the input signal to the neurofilter 18. The training signal is compared with the output signal from the neurofilter 18 by a comparator 30, to thereby obtain an error amount which is applied to adjust the weighting coefficient values of the neurofilter 18 as described for the preceding embodiments.

By repetitively executing such training until the amount of error becomes sufficiently low, the neurofilter 18 can be trained to distinguish between text and picture regions of the input image, with a high degree of accuracy.

It has further been found that the discrimination performance of such a neurofilter can be improved by applying suitable smoothing processing to the sequential image data (i.e. segmented image signal) produced from the neurofilter. The smoothing can be performed by a local simple averaging filter or by a median filter. In the case of a local simple averaging filter, the average of the set of output values from neurofilter 18 which correspond to a local region of the original image is assigned as the segmented image signal value for that local region (i.e. that average value can be considered to be assigned to the central picture element of that local region). For example, referring to FIG. 2 and assuming that the data array consists of multi-level values, with the values of the the local region W currently being supplied to the input layer of the neurofilter 18, then a specific output value will be obtained from the neurofilter 18, which can be considered to correspond to the central picture element of the local region W. Output values from the neurofilter 18 corresponding to each of the other picture elements within the local region W are similarly obtained, as the local region is stepped successively. With the averaging smoothing processing described above, the average of all of these output values from the neurofilter 18 is assigned as the segmented image signal value for the central picture element of the local region W.

Figure 7:
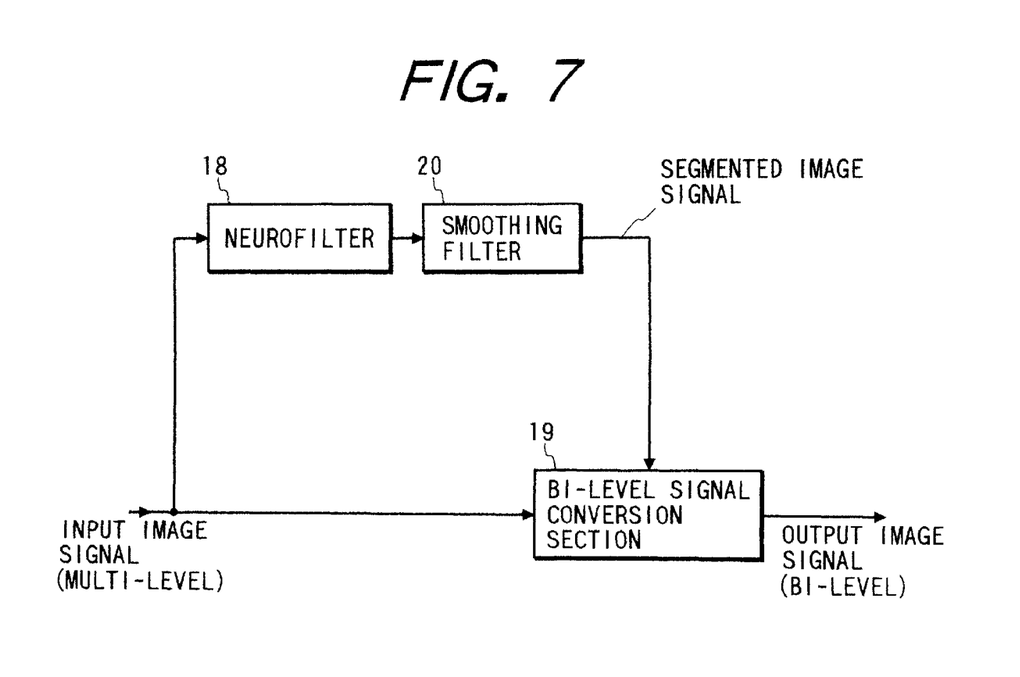
FIG. 7 is a general block diagram of a modification of the second embodiment, in which smoothing filtering is applies to output data obtained from the neurofilter.

Such an embodiment of the invention is shown in FIG. 7, in which the output data from the neurofilter 18 are transferred through a smoothing filter 20, to obtain the segmented image signal.

Designating the source image (i.e. the image which is expressed by the output data from the neurofilter 18) as f, and the image which results from the smoothing processing as g, the smoothing processing can be expressed as follows, if the smoothing filter 20 is a local simple averaging filter:

$$g(i, j) = \frac{1}{m \cdot n} \sum_{k=1}^{m} \sum_{l=1}^{n} f\left(i - \left[\frac{(m-1)}{2}\right] + k - 1, j - \left[\frac{(n-1)}{2}\right] + l - 1\right)$$

In the above, m and n determine the averaging matrix size, while [ ] are Gaussian symbols.

In the case of a median filter being used as the smoothing filter 20, the segmented image signal value for the central picture element of a local region is assigned as the median value of the set of values, produced from the neurofilter 18, which correspond to that local region. With that method it is therefore necessary to calculate a hystogram and to update the hystogram each time the local region is shifted, as it is successively stepped throughout the input image, to thereby obtain respective median values.

Although not shown in FIGS. 5 and 7, it would in practice be necessary to apply suitable amounts of signal delay, to ensure that the segmented image signal and the input image signal supplied to the bi-level signal conversion section 19 are are correctly synchronized.

Figure 9:
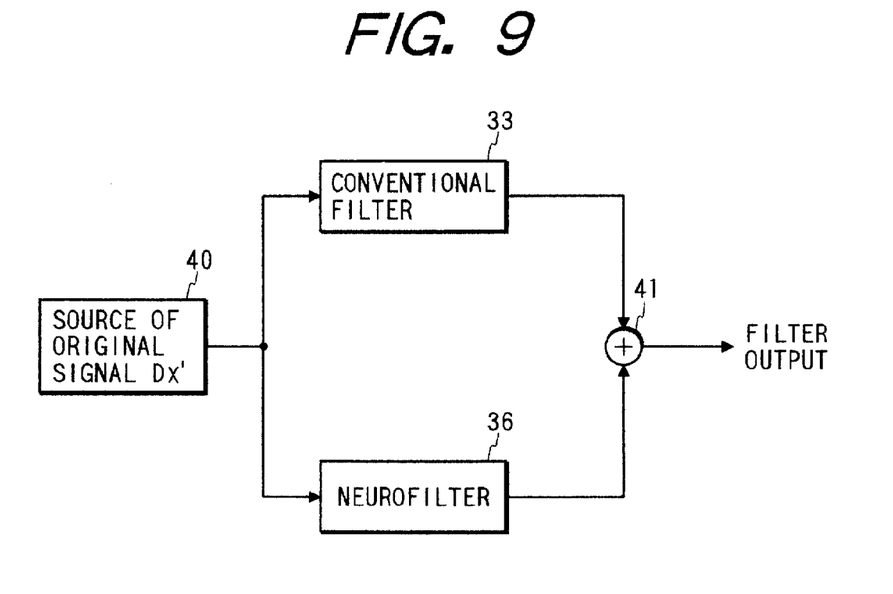
FIG. 9 is a general block diagram of a third embodiment of the invention, which is a parallel combination of a conventional filter and neurofilter.

Another embodiment of the invention will now be described, which is a filter apparatus that is formed of a combination of a neurofilter and a conventional filter, as illustrated in the simple block diagram of FIG. 9. As shown, data representing an original image are supplied (e.g. as successive sets of values for respective local regions of the image) in parallel to a neurofilter 36 and to a conventional filter 33. The resultant output data streams from the neurofilter 36 and conventional filter 33 are summed by an adder 41, to obtain filtered output image data. The function of the neurofilter 36 is to correct any errors which may arise in the output data from the conventional filter 33, resulting from non-linearity of the transfer function of the conventional filter 33.

The reasons for providing such a filter apparatus are as follows. The process of designing a conventional filter can be considered to have two basic aspects, i.e. the aspect of theoretically designing the filter (by calculations) such as to approximate to ideal operation, and the aspect of realizing an actual filter design. The approximation aspect is concerned with selecting filter parameters or coefficients which will provide a transfer function that will theoretically ensure a filter response that is close to optimum. This is often a frequency response. The aspect of realization of the design is concerned with actually achieving the desired transfer function. With the embodiment of the invention, the approximation problem and the design realization problem are both solved, by using a hybrid filter configuration, i.e. a combination of a conventional filter and a neurofilter. Specifically, the approximation problem is solved by the design of the conventional filter 33, which is designed based on previous research, using a numerical model. On the other hand, the function of the neurofilter 36 is to compensate for errors which may occur in the operation of the conventional filter 33, due to non-linearity of operation of the conventional filter. This enables a great relaxation in the severity of the design and manufacturing requirements for the conventional filter 33, i.e. the realization problem is effectively solved.

Figure 10:
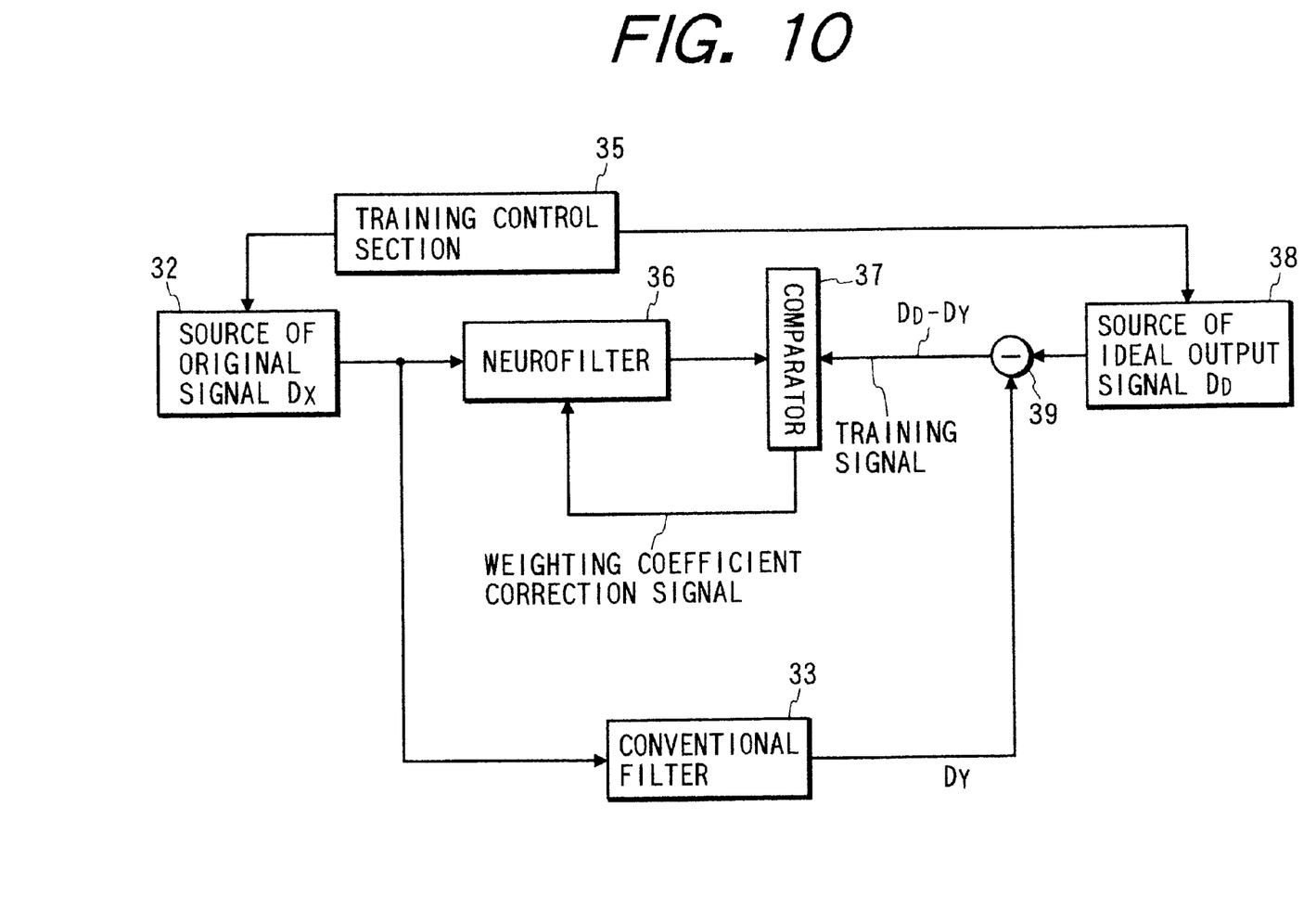
FIG. 10 is a general block diagram for illustrating a method of setting the weighting coefficients of the neurofilter of the third embodiment.

The basic operations necessary for training the neurofilter 36 are as follows, assuming for example that the filter apparatus is to perform spatial filtering of image data $D_X$, i.e. an array of picture element values representing an original image:

(a) Prepare beforehand ideal filter output data $D_D$, which constitute data that should ideally be obtained as a result of filtering the image data $D_X$;

(b) Input the image data $D_X$ to the conventional filter 33, thereby obtain corresponding output data $D_Y$ from the conventional filter 33;

(c) Execute training of the neurofilter 36, supplying the error data $(D_D-D_Y)$ of the output from the conventional filter 32 as a training signal and supplying the original image data $D_X$ as the input signal to the neurofilter 36.

The arrangement for performing training of the neurofilter 36 is illustrated in FIG. 10. Here, 32 denotes a source of the original image data $D_X$, which are sequentially supplied as the input signal to the neurofilter 36, while 38 denotes a source of ideal filter output data $D_D$ (calculated beforehand, as described above). The output signal from the source 32 is supplied also to the conventional filter 33, with the output signal from the conventional filter 33 being supplied to one input of a subtractor 39. The output signal from the source 38, i.e. a stream of ideal filter output data $D_D$, is supplied to the other input of the subtractor 39, whose output $(D_D-D_Y)$ is supplied as the training signal to one input of a comparator 37. The output signal from the neurofilter 36 is supplied to the other input of the comparator, and the error amount which is thereby detected by the comparator 37 is applied to correct the weighting coefficients of the neurofilter 36, as described for the preceding embodiments. A training control section 35 suitably synchronizes read-out of data from the source 32 of the original image data $D_X$ and the source 38 of the ideal output data $D_D$.

After the training processing has been completed, and the weighting coefficients of the neurofilter 36 have been fixed, the filter apparatus is configured by connecting the conventional filter 33 and neurofilter 36 in parallel to supply their output signals to the adder 41 as described above and shown in FIG. 9, with their respective inputs coupled to receive a common input signal. If now an arbitrary input image signal (i.e. image data of successive local regions of an arbitrary image) is supplied as the input signal of the filter apparatus, the resultant output signal obtained from the neurofilter 36 will accurately compensate for errors in the output signal from the conventional filter 33 that arise due to non-linearity of operation of the conventional filter 33.

Although the above embodiment has been described for the case of image processing, with data of successive local regions of an image being sequentially operated on, the embodiment is equally applicable to processing other types of input signal. That is to say, when filtering a serial data signal, successive sets of time-sequential values of the data would be operated on by the filter apparatus.

What is claimed is:

1. A neurofilter comprising:

a neural network having weighting coefficients which may be adjusted during a training procedure, said neural network having been subjected to a training procedure for setting said weighting coefficients such as to provide a specific type of filtering of image data or serial data which are sequentially supplied to said neural network, wherein said neurofilter operates on distorted image data expressing a blurred image, said blurred image resulting from transferring light which represents an original image, through a lens, onto an optoelectric transducer to generate said distorted image data, and wherein said neurofilter executes MTF compensation of said distorted image data to obtain output image data which substantially accurately represent said original image.

2. A neurofilter comprising:

a neural network having weighting coefficients which may be adjusted during a training procedure, said neural network having been subjected to a training procedure for setting said weighting coefficients such as to provide a specific type of filtering of image data or serial data which are sequentially supplied to said neural network, wherein said neurofilter functions as a separation filter for operating on image data expressing an original image, said neurofilter responding to data of respectively different predetermined types of image region within said original image by producing an output signal at correspondingly different levels, said neurofilter further comprising smoothing filter means for executing smoothing processing of said output signal.

3. A neurofilter according to claim 2, wherein said smoothing filter means comprises a local simple averaging filter which derives, for each of successive local regions within said original image, the average of a set of values of said output signal which correspond to said each local region.

4. A neurofilter according to claim 2, wherein said smoothing filter means comprises a local simple averaging filter which derives, for each of successive local regions within said original image, the median value of a set of values of said output signal which correspond to said each local region.

5. A filter apparatus comprising a parallel combination of a conventional filter and a neurofilter, having respective inputs thereof coupled in common, and means for combining output data produced from said neurofilter with output data produced from said conventional filter to thereby compensate for errors in said output data from the conventional filter, said neurofilter comprising a neural network having weighting coefficients which may be adjusted during a training procedure, said neural network having been subjected to a training procedure for setting said weighting coefficients such that respective output data produced from said neural network in response to sequentially supplied input data substantially correspond to amounts of difference between actual output data which are produced from said conventional filter in response to said input data and ideal data which are required to be obtained in response to said input data.

* * * * *